(12) United States Patent
Koto et al.

(10) Patent No.: US 6,314,139 B1
(45) Date of Patent: Nov. 6, 2001

(54) METHOD OF INSERTING EDITABLE POINT AND ENCODER APPARATUS APPLYING THE SAME

(75) Inventors: Shinichiro Koto, Kawasaki; Keiichiro Fujie, Tokyo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/144,985

(22) Filed: Sep. 1, 1998

(30) Foreign Application Priority Data

Sep. 2, 1997 (JP) .................................................. 9-237033

(51) Int. Cl.$^7$ ...................................................... H04N 7/12
(52) U.S. Cl. ........................................................ 375/240.12
(58) Field of Search ........................... 348/415, 416, 348/420, 584; 382/236; 375/240, 240.12

(56) References Cited

U.S. PATENT DOCUMENTS

| | | | |
|---|---|---|---|
| 5,559,562 | * 9/1996 | Ferster | 348/584 |
| 5,686,964 | * 11/1997 | Tabatabai et al. | 348/420 |
| 5,793,894 | * 8/1998 | Sugiyama | 382/236 |
| 5,912,709 | * 6/1999 | Takahashi | 348/416 |
| 6,088,396 | * 7/2000 | Takahashi | 348/416 |

FOREIGN PATENT DOCUMENTS

| | | |
|---|---|---|
| 9-23405 | 1/1997 | (JP) . |
| 9-154099 | 6/1997 | (JP) . |
| 9-163304 | 6/1997 | (JP) . |

* cited by examiner

Primary Examiner—Chris Kelley
Assistant Examiner—Allen Wong
(74) Attorney, Agent, or Firm—Oblon, Spivak, McClelland, Maier & Neustadt, P.C.

(57) ABSTRACT

Coding mode information, VBV buffer occupancy information, and display field phase information corresponding to a coded frame are extracted in units of coded frames of a video signal. Condition determination is performed, on the basis of these pieces of extracted information, with respect to a standardized editable point at which at least part of the coded data can be connected to another coded data seamlessly in terms of the coding mode, the buffer occupancy, and the display field phase. If it is determined that the editable point for which insertion designation is performed does not satisfy the standardized editable point conditions, the editable point, for which insertion designation is performed, is delayed until the conditions are satisfied, thereby inserting the editable point at the delayed time point.

22 Claims, 8 Drawing Sheets

METHOD OF INSERTING EDITABLE POINT AND ENCODER APPARATUS APPLYING THE SAME

BACKGROUND OF THE INVENTION

The present invention relates to a coder apparatus for performing compression of a video signal and/or audio signal and recording the resultant data on a storage medium such as a hard disk or optical disk and, more particularly, to a method of inserting an editable point when part or all of coded data is to be connected to another coded data, and a coder apparatus using the same.

In general, image signals output from a video camera are independent in units of frames regardless of whether they are applied to commercial use/home use or analog recording/digital recording. For this reason, so-called cut and paste editing for image signals in units of frames is relatively easy to perform.

In contrast to this, according to MPEG2 as international standards of a video/audio coding scheme which is widely used for read-only optical disks such as DVD-ROMs, digital broadcasting, and the like, the numbers of generated bits are adaptively assigned to the respective frames and hence vary in both constant bit rate coding and variable bit rate coding to improve the correction efficiency. In addition, since interframe prediction is used, it is generally not easy to perform cut and paste editing for coded data in units of arbitrary frames.

According to some method, therefore, in video coding based on the MPEG2 standards, to perform correct editing, closed GOPs that inhibit interframe prediction at the GOP boundaries are used to perform editing in units of GOPs (Group of Pictures) each consisting of a plurality of frames, thereby allowing random access. To perform continuous reproduction without any seams between different GOPs and to prevent transmission/receive buffers for coded data from underflowing or overflowing, connection must be performed to satisfy the VBV (Video Buffering Verifier) conditions. If, however, the GOP length is decreased and the VBV conditions are satisfied at the same time to increase the number of random access points so as to increase the degree of freedom in editing, the coding efficiency decreases.

As described above, in conventional video coding based on the MPEG2 standards, as the degree of freedom in editing such as cut and paste editing in units of frames increases, the coding efficiency decreases.

BRIEF SUMMARY OF THE INVENTION

It is an object of the present invention to provide an editable point insertion method in a coder apparatus which can efficiently perform editing while preventing a decrease in coding efficiency by inserting efficient editable points in compressing/coding video and audio data.

According to the present invention, there is provided an editable point insertion method in an image coder apparatus, comprising receiving coded image data obtained by coding a video signal in units of predetermined coded frames by one of a plurality of coding modes including intra coding and motion compensated interframe predictive coding, checking whether editable point insertion designation is made, extracting information associated with the coding mode, a buffer occupancy of a VBV (video buffering verifier), and a display field phase corresponding to the coded frame, from the coded image data or an encoding controller in units of coded frames, performing condition determination on the basis of the extracted information to obtain a standardized editable point at which at least part of the coded image data can be connected to another coded image data seamlessly in terms of the coding mode, the buffer occupancy, and the display field phase, and when it is determined in response to editable point insertion designation that an editable point does not satisfy a condition for the standardized editable point, inserting the editable point for which the insertion designation has been performed upon delaying the editable point until it is determined that the condition is satisfied.

According to the present invention, there is provided a coder apparatus comprising coding section for coding an input video signal in units of predetermined coded frames by using one of a plurality of coding modes including intraframe coding and motion compensated interframe predictive coding, and outputting the coded data, a coding mode control section for controlling switching of the coding modes, a bit allocation control section for controlling the number of generated bits of the coded data from the coding section in accordance with a video buffering verifier, an extraction section for extracting information of a display field phase corresponding to the coding mode, a buffer occupancy of the video buffering verifier, and the coded frame in units of coded frames, a condition determination section for performing condition determination, on the basis of the information extracted by the extraction section, with respect to a standardized editable point at which at least part of the coded image data can be connected to another coded image data seamlessly in terms of the coding mode, the buffer occupancy, and the display field phase, and an editable point insertion section for, when the condition determination section determines that the editable point for which insertion designation has been performed does not satisfy the condition for the standardized editable point, inserting the editable point upon delaying the editable point, for which insertion designation has been performed, until the condition is satisfied.

According to the present invention, in a coder apparatus for coding an input video signal in units of predetermined coded frames by one of a plurality of coding modes including intraframe coding and motion compensated interframe predictive coding, and outputting the coded data, or in a coder apparatus for outputting coded video data and also coding an audio signal corresponding to a video signal to output the coded audio data, there is provided an editable point insertion method of extracting coding mode information, buffer occupancy information of a video buffering verifier, and display field phase information corresponding to a coded frame, performing condition determination, on the basis of these pieces of extracted information, with respect to a standardized editable point at which part or all of the coded video and audio data can be connected to other coded video and audio data seamlessly in terms of the coding mode, the buffer occupancy, and the display field phase, and when it is determined that the editable point for which insertion designation is performed does not satisfy the standardized editable point condition, delaying the editable point, for which the insertion designation is performed, until it is determined that the condition is satisfied, thereby inserting the editable point.

More specifically, when it is determined that the editable point for which the insertion designation is performed does not satisfy the standardized editable point condition, control including at least one of operations of (a) changing a coding mode, (b) reducing the number of bits assigned to a next coded frame, and (c) inverting a field phase of the coded frame is performed to delay the editable point, for which the insertion designation is performed, until it is determined by the condition determination processing that the standardized editable point condition is satisfied.

With this operation, the strict coding control conditions for editable point insertion can be minimized, and a decrease in coding efficiency can be prevented while an editable point can be inserted near a desired editable point position.

The position of the designated editable point corresponds to at least one of (a) time at predetermined intervals, (b) time designated in advance, (c) time of a change point of image contents which is detected from a change in parameter including at least one of a scene change of the input video signal or a motion vector, a luminance, and a chrominance signal value, and (d) a manually designated position.

Assume that the position of an editable point is designated like (a) or (b). In this case, even if the above standardized editable point conditions are not satisfied, the designated editable point can be easily inserted by delaying the editable point by a period of time corresponding to several frames. If the position of an editable point is automatically designated like (c), edition processing can be facilitated. In addition, when the video signal of a video camera is coded and recorded, coded data after taking a video picture can be easily edited by manually designating an editable point by marking an editable point in the coded data in accordance with cameraman's intention like (d).

An editable point can be inserted as follows: (1) recording editable point position information in the coded video data or in the coded video and audio data as data independent of the coded data; (2) multiplexing editable point position information in the coded video data or in the coded video and audio data with the coded data; and (3) recording the editable point position information in the multiplexed data, obtained by multiplexing coded video and audio data, independently of the coded video and audio data included in the multiplexed data or multiplexing the position data with the coded video and audio data.

When an editable point is inserted in this manner, the position information of the editable point can be easily used in edition processing. In addition, when a video signal and a corresponding audio signal are to be simultaneously coded, simultaneous edition processing for the video and audio data can be facilitated by adding pieces of corresponding editable point information to the coded video and audio data.

Moreover, according to the present invention, there is provided a recording medium on which, when part or all of coded video data or of coded video and audio data is to be connected to other coded video data or coded video and audio data in the above manner, editable point position information that allows seamless connection in terms of a coding mode for the coded video data, a buffer occupancy of a video buffering verifier, and a display field phase with respect to a coded frame is recorded, together with the coded video data or the coded video and audio data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 1A:
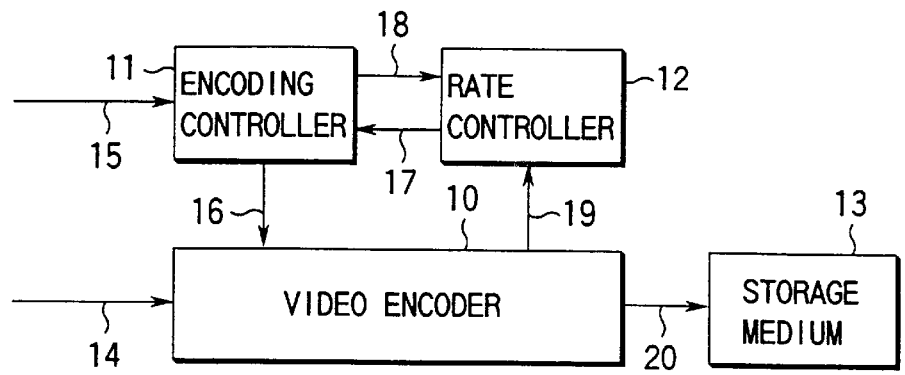
FIGS. 1A and 1B are block diagrams showing the arrangement of a coder apparatus according to the first embodiment of the present invention.
Figure 1B:
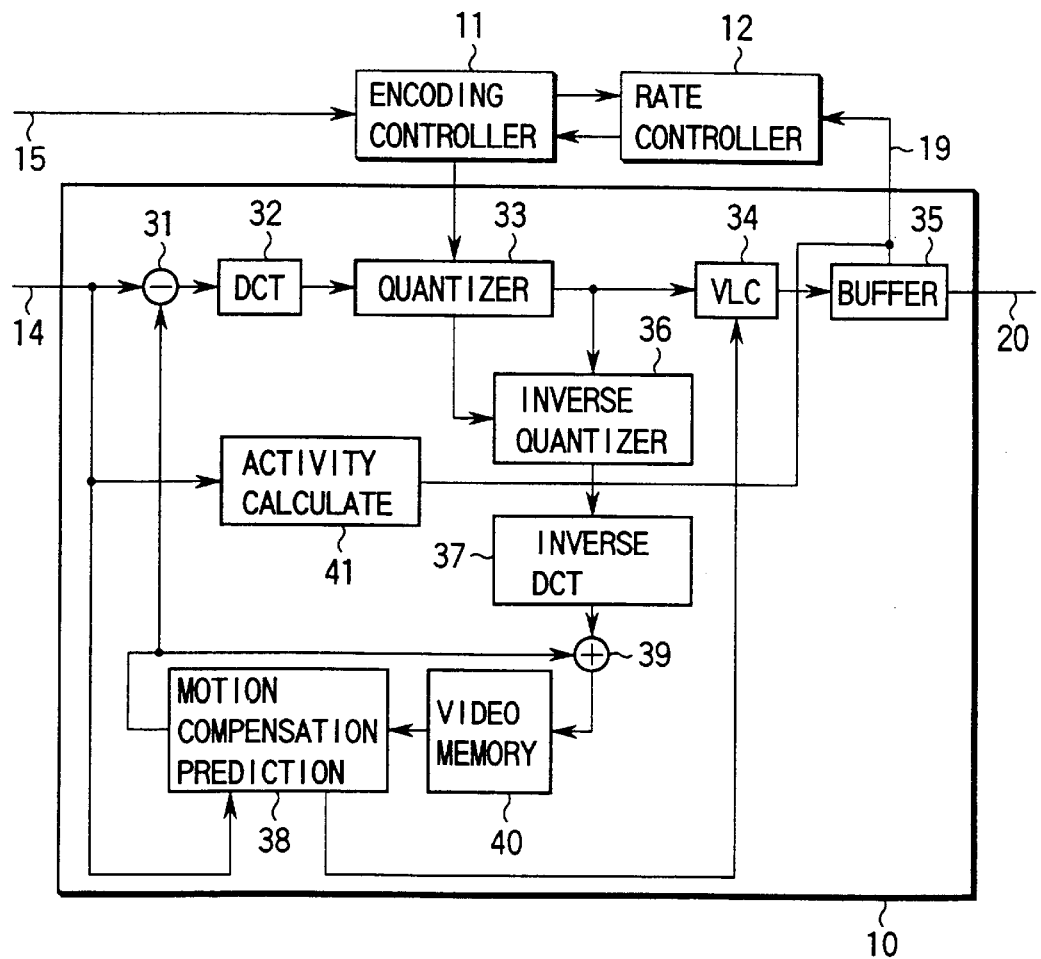

FIG. 1 shows the arrangement of a coder apparatus according to the first embodiment of the present invention. This coder apparatus is a video coder apparatus having an editable point insertion function. This apparatus includes a video coder 10, an encoding controller 11, a rate controller 12, and a storage medium 13. The video coder 10 codes an input video signal 14 on the basis of MPEG2 and outputs coded video data 20. The coded video data 20 is written in the storage medium 13 such as a hard disk or optical disk. The coded video data 20 may be output to a channel.

The video coder 10 a subtractor 31 for subtracting a predictive picture from an input picture to output an predictive error, a DCT (discrete cosine transformer) 32 for subject the predictive error to a discrete cosine transform, a quantizer 33 for quantizing the DCT coefficient obtained by the DCT 32, a VLC (variable length coder) 34 for subjecting the quantized output to a variable length coding, a buffer 35 for temporarily storing the VLC output, an inverse quantizer 36 for inversely quantizing the quantized output, an inverse discrete cosine transformer 37 for subjecting the inverse-quantized output to an inverse cosine transform, an adder for adding the output of the inverse DCT 37, i.e., local-decoded predictive error and the predictive picture from the motion compensation predictive circuit 38, a video memory 40 for storing the local decoded picture obtained by the adder 39, and an activity calculator 41 for calculating an activity based on variance of the pixel value of each block of the input video.

The video coder 10 extracts statistical amount information 19 including at least one of the number of generated bits, the motion vector of the input video signal 14, and the activity at the instant coding is performed. The video coder 10 transfers this information to the rate controller 12.

The rate controller 12 controls the number of generated bits (rate control) by performing bit allocation based on feedback control on the basis of the statistical amount information 19 from the video coder 10 and coding mode parameter information 18 including picture type information supplied from the encoding controller 11, i.e., information about picture types including an I picture (intra coded picture), a P picture (forward predictive coded picture), end a B picture (bi-directional predictive coded picture).

The rate controller 12 performs bit allocation in units of GOPs (Group Of Pictures), pictures, and macroblocks, determines a quantization scale value in the video coder 10 on the basis of the allocation result, and supplies quantization scale value information 17 to the encoding controller 11.

Coding control parameters 16 including a quantization scale value and picture type information are output from the encoding controller 11 to the video coder 10. The video coder 10 is controlled by these parameters.

In this case, the encoding controller 11 determines a GOP configuration (especially a GOP length) and editable point insertion positions in accordance with input editable point insertion information 15. Actual editable point insertion is performed by the encoding controller 11 and the rate controller 12 in cooperation.

Conditions for editable points (conditions for coded data connection points) will be described next with reference to FIGS. 2 to 5 by taking, for example, a case wherein a video coding scheme based on the MPEG2 standards is used for the video coder 10.

Figure 2A:
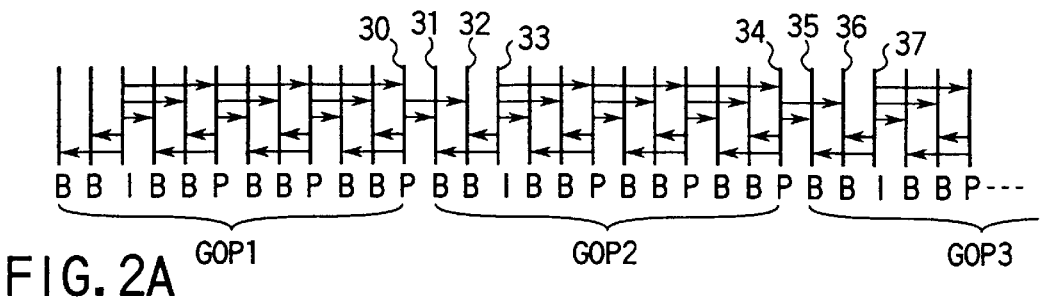
FIGS. 2A and 2B are views each showing examples of a GOP configuration and an interframe predictive structure to explain conditions for coded data connection points in edition processing.
Figure 2B:
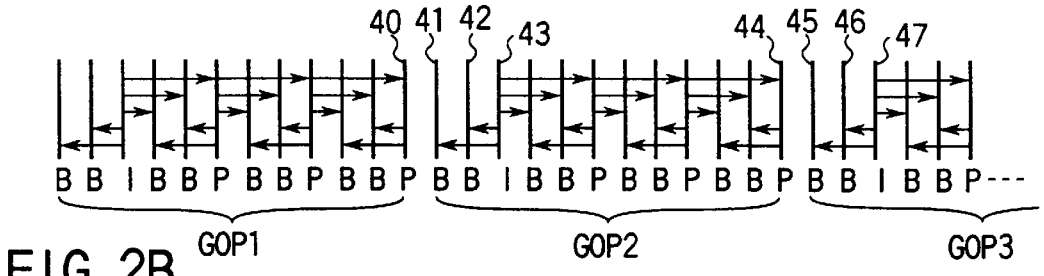

In the video coding scheme based on the MPEG2 standards, an image to be coded is composed of I pictures, i.e., intra coded pictures, P pictures, i.e., forward predictive pictures, and B pictures, i.e., bi-directional predictive pictures, and has an inter predictive structure like the one shown in FIG. 2A or 2B. Referring to FIGS. 2A and 2B, the tails and heads of each arrow respectively indicate a reference image and a coded image. In general, inter predictive refreshing is performed in units of GOPs, each starting from an I picture, in the coding order.

GOP configurations can be classified into the one shown in FIG. 2A, in which B pictures 31 and 32 on the front side in terms of the display order of the pictures in GOP 2 are predicted from a last P picture 30 in the preceding GOP (GOP 1), and the one shown in FIG. 2B, in which B pictures 41 and 42 on the front side in terms of the display order of the pictures in GOP 2 are formed without using any pictures in the preceding GOP as reference images. The latter is called a closed GOP.

In the case of closed GOPs, random access can be easily performed in units of GOPs, but a decrease in coding efficiency is inevitable in general because the B pictures on the front side are not predicted from any preceding pictures. In contrast to this, in the case of GOPs other than closed GOPs, although the coding efficiency is higher than that in the case of closed GOPS, random access and cut and paste editing are difficult to perform.

Assume that GOP 1 and GOP 3 are to be connected to each other and continuously reproduced in the case shown in FIG. 2A. In this case, since two B pictures 35 and 36 on the front side of GOP 3 are erroneously predicted from the last P picture 30 of GOP 1 as a reference image instead of the last P picture of GOP 2 which is a correct reference image 34, it is difficult to correctly reproduce the image. In contrast to this, in the case shown in FIG. 2B, when GOP 1 and GOP 3 are to be connected and continuously reproduced, since B pictures 45 and 46 on the front side of GOP 3 are predicted from only a first I picture 47 of GOP 3, the reproduced image is free from disturbance.

As described above, to smoothly perform cut and paste editing, video data must be coded into closed GOPs in general. As is obvious from this example as well, the coding efficiency contradicts the degree of freedom in handling, e.g., random access and cut and paste editing of coded data.

Figure 3A:
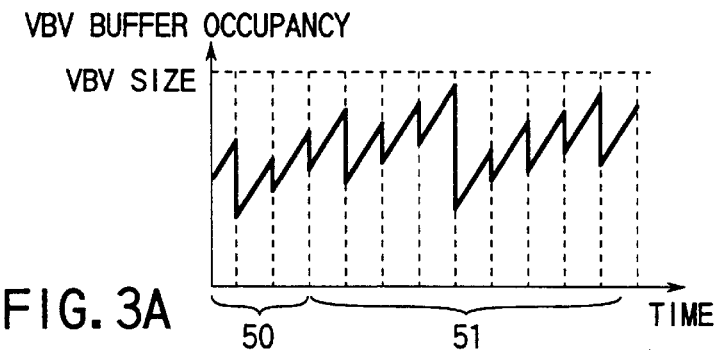
FIGS. 3A to 3C are graphs showing an example of a shift in the buffer occupancy of the VBV buffer model in constant bit rate coding to explain the conditions for coded data connection points in edition processing.
Figure 3B:
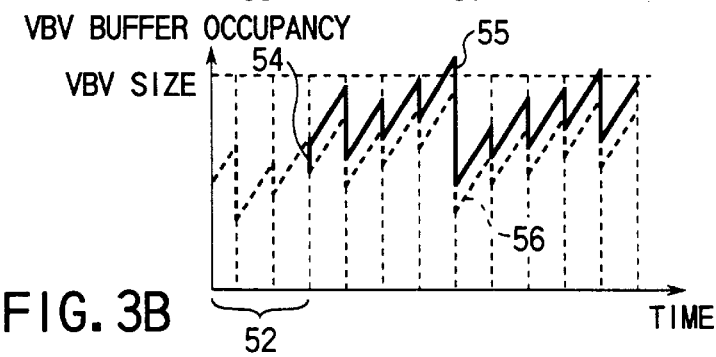
Figure 3C:
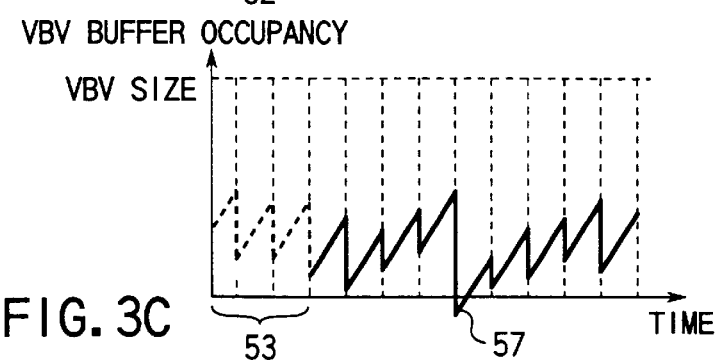

FIGS. 3A, 3B, and 3C show an example of a shift in the buffer occupancy of a VBV (Video Buffering Verifier) model in constant bit rate coding defined by the MPEG2 standards. "VBV" is a video buffering verifier (to be referred to as a VBV buffer hereinafter) in a virtual decoder. Preventing the VBV buffer from overflowing and underflowing is a condition for a correct coded stream. In the coder apparatus, the rate controller generally performs coding control to satisfy the condition for the VBV buffer (preventing the VBV buffer from overflowing and underflowing).

FIG. 3A shows the VBV buffer occupancy resulting from continuous coding. The ordinate represents the buffer occupancy, and the abscissa, the time. Assume that a portion corresponding to an interval 51 is cut from the coded data in FIG. 3A to be connected to another coded data by edition. In this case, if, for example, the coded data in the interval 51 is connected to another coded data exhibiting a shift in VBV buffer occupancy like that in an interval 52 in FIG. 3B, the VBV buffer overflows. If the coded data in the interval 51 is connected to another coded data exhibiting a shift in VBV buffer occupancy like that in an interval 53 in FIG. 3C, the VBV buffer underflows. As described above, if data connection is arbitrarily performed on the coded data level, the VBV buffer condition may not be satisfied.

In this case, however, as in an interval 55 in FIG. 3B, if the VBV buffer occupancy shifts toward the overflow side as compared with the state before edition shown in FIG. 3A, a VBV buffer occupancy shift 56, which is perfectly equal to that in the interval 51 in FIG. 3A, can be set even after edition by inserting stuffing data 54 at the coded data connection point. More specifically, in constant bit rate coding based on the MPEG2 standards, coded data can be connected by stuffing processing as long as the first VBV buffer occupancy at an editable point is smaller than the last VBV buffer occupancy of the preceding coded data. In contrast to this, when the VBV buffer occupancy shifts toward the underflow side upon edition as shown in FIG. 3C, it is generally difficult to prevent an underflow.

Figure 4A:
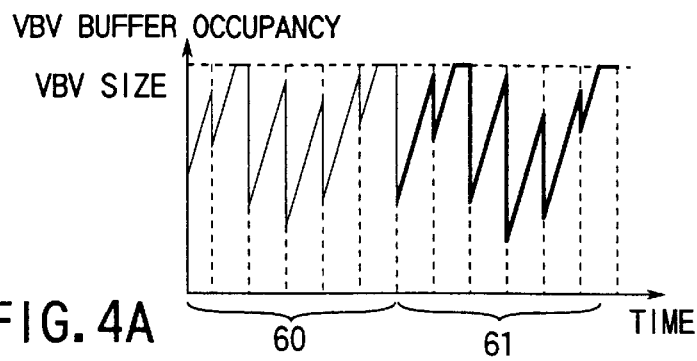
FIGS. 4A to 4C are graphs showing an example of a shift in the buffer occupancy of the VBV buffer model in variable bit rate coding to explain the conditions for coded data connection points in edition processing.
Figure 4B:
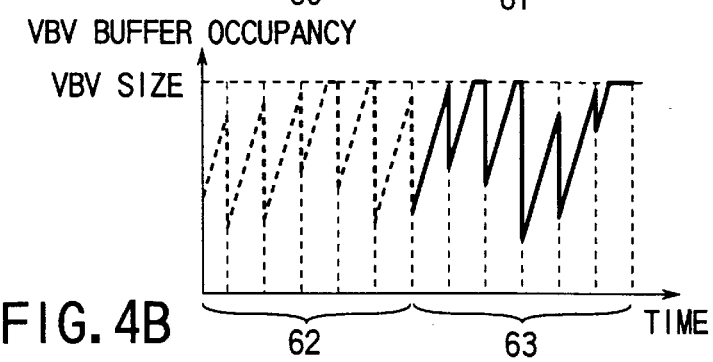
Figure 4C:
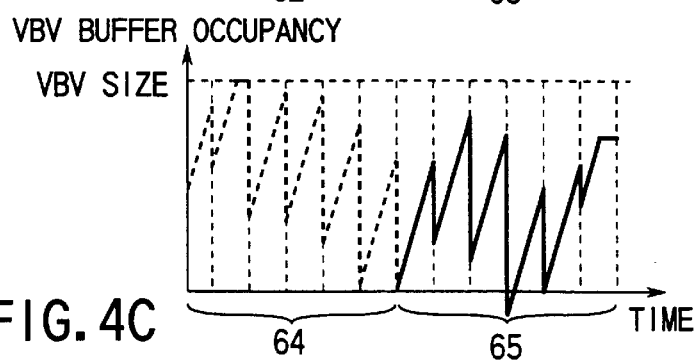

FIGS. 4A, 4B, and 4C show an example of a shift in the buffer occupancy of the VBV buffer model generally called a leak model in variable bit rate coding. In this leak model, when, for example, the data in an interval 61 in FIG. 4A is connected to the end of the data in an interval 62 in FIG. 4B or the data in an interval 64 in FIG. 4C, it is generally difficult to prevent the VBV buffer from underflowing, if the buffer occupancy shifts toward the underflow side as shown in FIG. 4C as in the case of the constant bit rate model described with reference to FIGS. 3A, 3B, and 3C. In contrast to this, if the buffer occupancy shifts toward the overflow side, no VBV failure occurs without performing any specific processing.

Figures 5A, 5B:
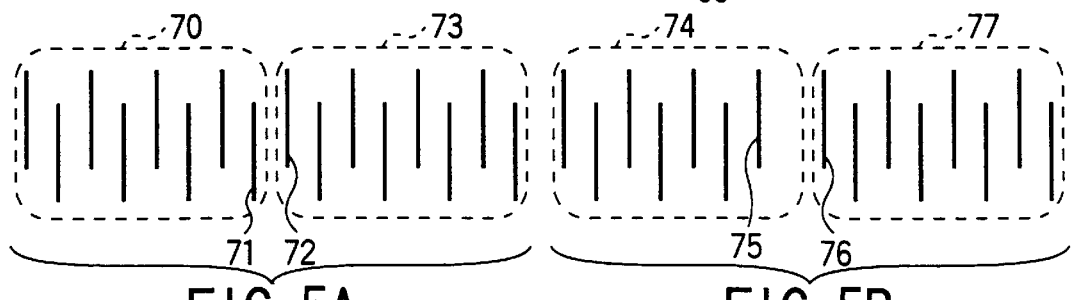
FIGS. 5A to 5C showing various examples of field phases at coded data connection points to explain the conditions for coded data connection points in edition processing.
Figure 5C:
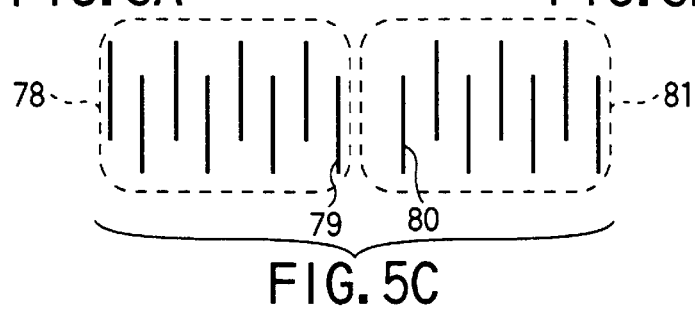

FIGS. 5A, 5B, and 5C are views for explaining field phase conditions at coded data connection points. According to the MPEG2 standards, for example, to display a coded image with a frame rate of 24 Hz on a display with a field rate of 60 Hz, a mechanism for periodically and repeatedly displaying the first field and converting the coded picture rate and the display frame rate (3:2 pull-down) is used. Upon this frame rate conversion, the first field of each coded picture does not always coincide with the first field of the display system, and the last field of each coded picture does not always coincide with the second field of the display system.

FIG. 5A shows a case wherein coded data 70 whose display ends at a bottom field 71 is connected to coded data 73 whose display starts at a top field 72. In this case, these data can be connected seamlessly. In contrast to this, in the cases shown in FIGS. 5B and 5C, all of the last displayed fields 75 and 79 of preceding coded data 74 and 78 and the first displayed fields 76 and 80 of coded data 77 and 81, which are to be respectively connected to the last fields 75 and 79, are in phase with each other. This makes it difficult to continuously connect the coded data.

As described with reference to FIGS. 2 to 5, it is difficult to perform cut and paste editing of coded data without considering conditions concerning a picture prediction structure, VBV buffer occupancy, and a display field phase at a coded data connection point. In this embodiment, cut and paste editing on the coded data level can be performed by inserting editable points in consideration of these conditions.

An editable point insertion sequence in this embodiment will be described next.

Figure 6:
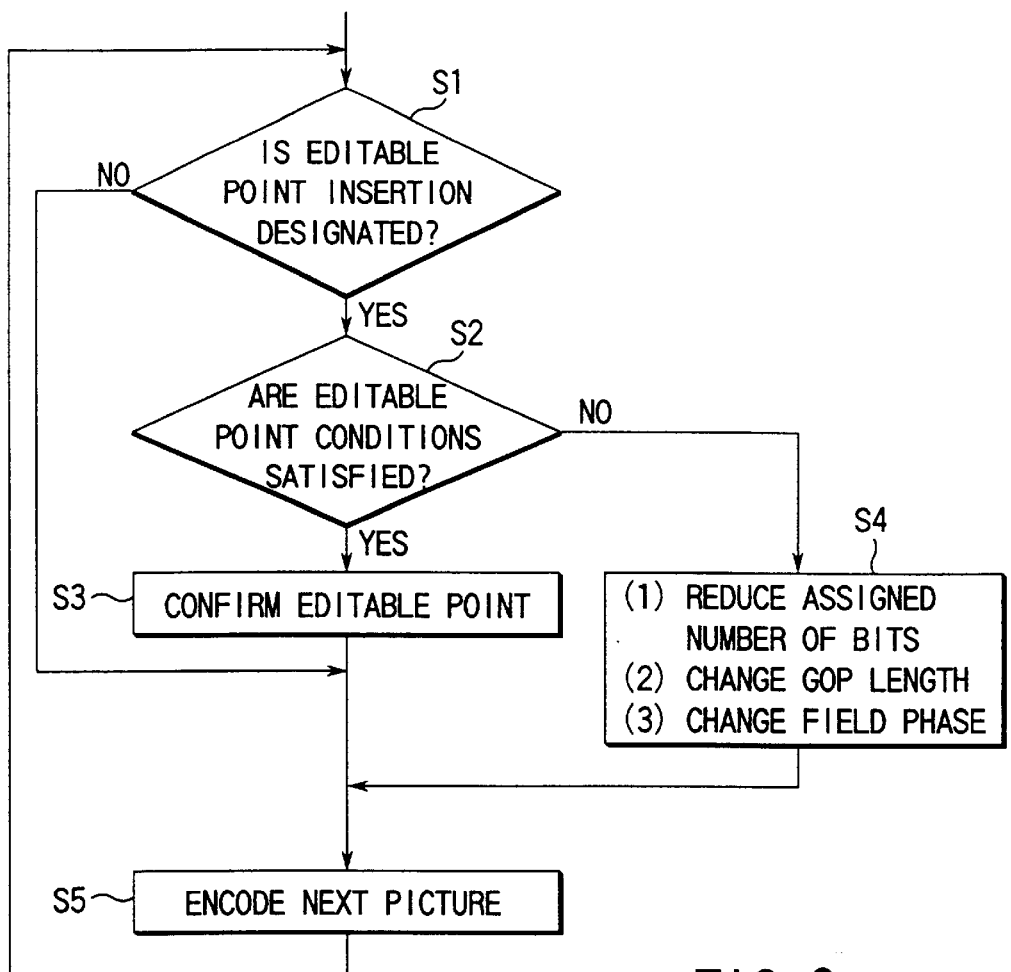
FIG. 6 is a flow chart for explaining an editable point insertion sequence in the first embodiment.

FIG. 6 shows the editable point insertion sequence. First of all, whether editable point insertion is designated is checked for each picture coding operation (coded frame) in accordance with user's intention or automatically (step S1). If the designation of editable point insertion is determined, it is checked whether the standardized editable point conditions are satisfied (step S2). Assume that a standardized editable point satisfies all the following three conditions:

(1) The next coded picture should be the first coded picture of a closed GOP.
(2) The VBV buffer occupancy should be a predetermined value or more.
(3) The preceding display frame should end at the bottom field.

The above conditions are extracted on the basis of at least one of (1) the encoded data, (2) the value that the encoding controller sets to the encoder, and (3) the parameters used in the encoder through the encoding controller.

When these conditions are satisfied, cut and paste editing can be arbitrarily performed in units of editable points. If a given point satisfies these standardized editable point conditions, the point is confirmed as an editable point (step S3). If these conditions are not satisfied, processing is performed to satisfy the conditions in step S4, thereby delaying determination of an editable point to the next picture or subsequent picture.

More specifically, if, for example, condition (1) is not satisfied, the GOP configuration (especially the GOP length) is dynamically changed by control on the coding mode. If condition (2) is not satisfied, rate control (bit allocation control) is performed to satisfy the VBV condition at the editable point by reducing the numbers of generated bits assigned to the next picture (next coded frame) and subsequent picture. If condition (3) is not satisfied, the field phase is adjusted by using the 3-field-period display picture (the repeat first field in MPEG2). When these editable point conditions are satisfied by these operations, an editable point is inserted. The next picture is then coded (step S5).

The processing for satisfying the conditions in step S4, i.e., (1) Reducing the assigned number of bits, (2) Changing a GOP length, and (3) Changing a field phase will be described hereinafter.

(1) Reducing the assigned number of bits:

In a bit allocation step, R bits are assigned to each GOP. T bits of R bits are assigned to each picture. The number of R bits is feedback-controlled in a GOP cycle and a picture cycle.

In rate control step, a quantization step size is determined by a feedback control for each macroblock in accordance with the number of bits T assigned for each picture.

In adaptive quantization step, the determined quantization step size is weighted in accordance with an activity of each macroblock of the input picture.

The DCT coefficient is quantized in the weighted quantization step size.

When the VBV buffer condition is satisfied at the editable point, if the number of bits R for the GOP or the number of bits T for picture is set at R'=K×R or T'=k×T (0<k<1), the assigned number of bits can be reduced.

(2) Changing a GOP length:

Where the GOP is shortened, I picture is inserted in the GOP. Where the GOP is extended, I picture is changed to P picture. This processing may be referred to Japanese Patent Application 10-70241.

Figure 18A:
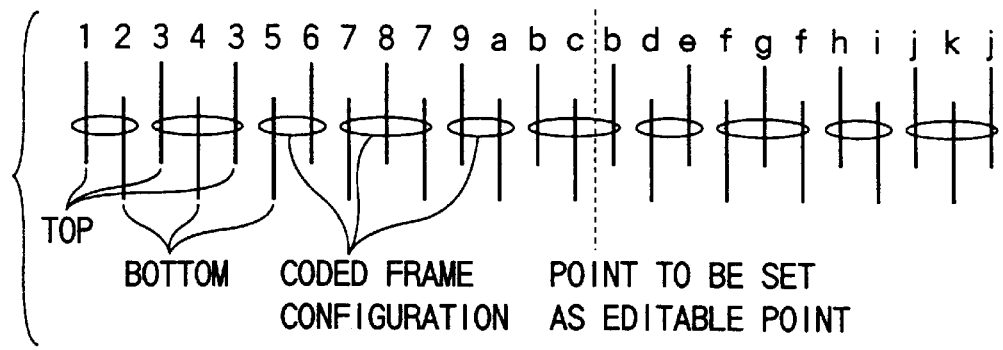
FIGS. 18A and 18B are diagrams for explaining a method of changing a field phase.
Figure 18B:
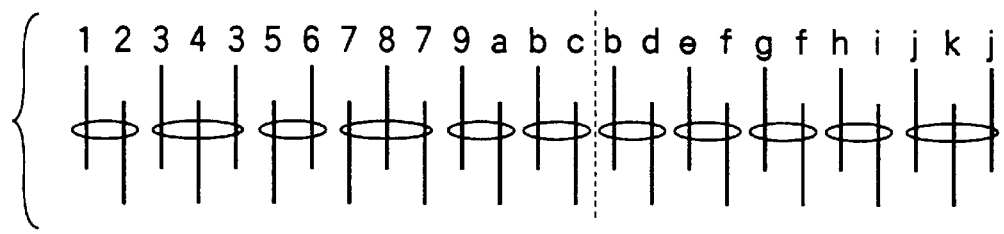

(3) Changing a field phase:

The editable point is defined as terminating at the bottom field and starting at the top field. The numbers 1, 2, 3, . . . shown in FIGS. 18A, 18B, 19A and 19B indicate field numbers. The same filed numbers are displayed as the same picture. The fields enclosed by an ellipse are encoded as a single coded frame. In FIG. 18A, the point (a boundary between fields c and b) to be set as the editable point is not coincided with the boundary of the coded frame. In this case, the field configuration of the coded frame is changed as shown in FIG. 18B to forcefully form a coded frame boundary between the fields b and c.

Figure 19A:
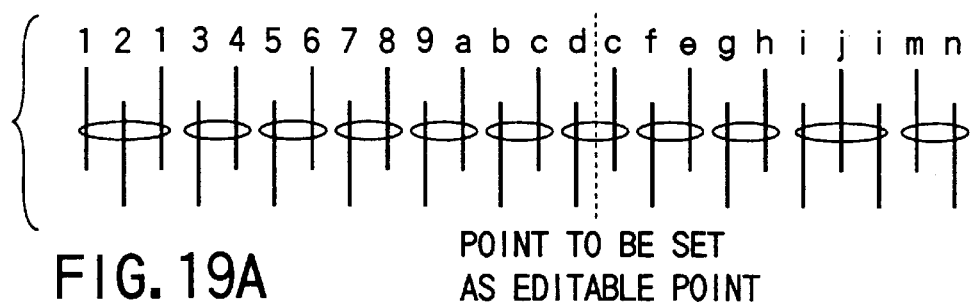
FIGS. 19A and 19B are diagrams for explaining another method of changing a field phase.
Figure 19B:
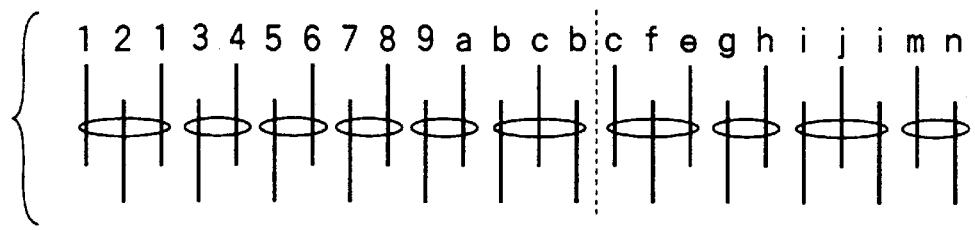

Similarly, the field configuration of the coded frame is changed from a configuration shown in FIG. 19A to that in FIG. 19B in order to form a coded frame boundary between the fields d and e. In this case, one of the fields b, c and d of the field configuration b-c-d shown in FIG. 19A, i.e., field b is repeated so that a field configuration b-c-b as shown in FIG. 19B is formed. In this time, the field d is not encoded but replaced with the field b.

An editable point insertion method in this embodiment will be described in detail next with reference to FIGS. 7 and 8.

Figure 7:
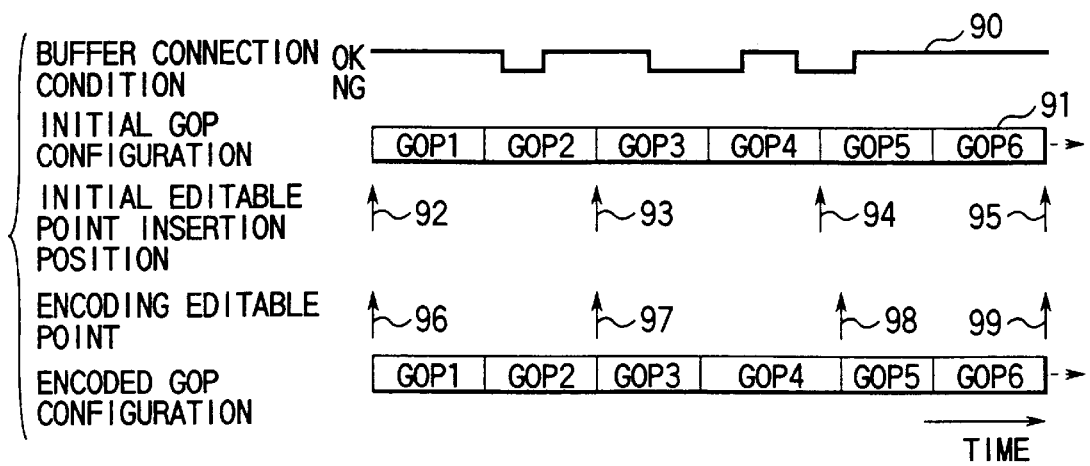
FIG. 7 is a timing chart showing a method of periodically inserting editable points in the first embodiment in detail.
Figure 8:
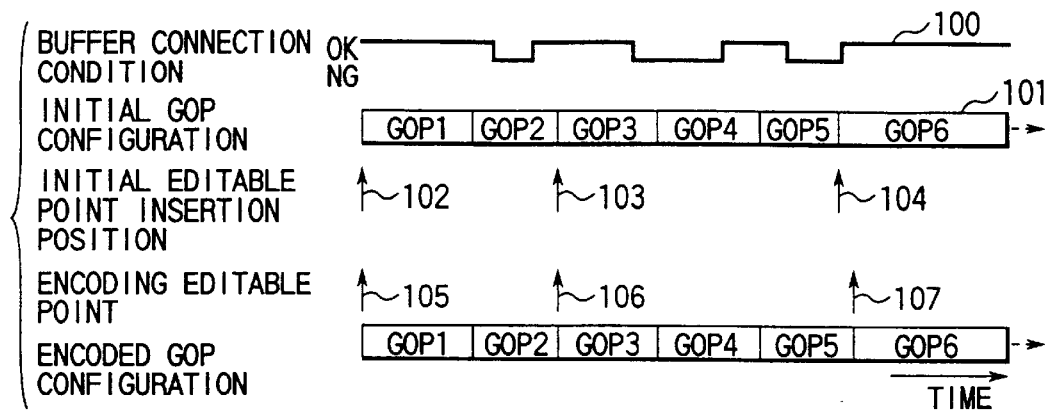
FIG. 8 is a timing chart showing a method of inserting pre-designated editable points in the first embodiment in detail.

In this embodiment, editable point insertion is designated in step S1 in FIG. 6 periodically at predetermined intervals as shown in FIG. 7 or sequentially at predetermined time points as shown in FIG. 8. Referring to FIGS. 7 and 8, a designated editable point position is referred to as an "initial editable point insertion position", and a finally inserted editable point is referred as an "coding editable point".

Referring to FIG. 7, initial editable point insertion positions 92 to 95 are set at positions corresponding to integer multiples of the length of a GOP 91 with respect to a constant length GOP configuration (initial GOP configuration) before editable point insertion. In coding operation, a standardized editable point condition is checked in step S2 in FIG. 6 for each of the initial editable point insertion positions 92 to 95. In this condition determination processing, in the case shown in FIG. 7, it is checked whether a buffer connection condition 90 is satisfied, i.e., condition (2) that the VBV buffer occupancy should be equal to or larger than the predetermined value is satisfied.

If it is determined upon this condition determination that the standardized editable point condition is satisfied, an editable point (coding editable point) is immediately inserted at the initial editable point insertion position. In the case shown in FIG. 7, of the initial editable point insertion positions 92 to 95, the positions 92, 93, and 95 are "OK" with respect to the buffer connection condition 90, i.e., satisfy the standardized editable point condition, and hence are confirmed as editable points in step S3 in FIG. 6. As a result, the coding editable point points 96, 97, and 99 are inserted at these positions 92, 93, and 95.

Another initial editing editable point insertion position 94 is "NG" with respect to the buffer connection condition 90, i.e., does not satisfy the standardized editable point. Rate control is therefore performed by reducing the assigned number of bits in step S4 in FIG. 6, and the editable point insertion position 94 is delayed until the buffer connection condition 90 is satisfied, thereby inserting a coding editable point 98 at the delayed position. Meanwhile, the length of GOP 4 immediately preceding the initial editing editable point insertion position 94 is increased, and the initial editable point is automatically adjusted to be located at the start of GOP 5.

In addition, a closed GOP is set as a GOP immediately before a coding editable point is inserted, and general GOPs are set as the remaining GOPs. This allows insertion of the coding editable point while suppressing a decrease in coding efficiency. In the case shown in FIG. 7, the odd-numbered GOPs immediately before the insertion of the coding editable points 96, 97, 98, and 99 are closed GOPs, whereas the even-numbered GOPs are general GOPs.

Referring to FIG. 8, in accordance with user's intention, editable point insertion positions 102 to 104 are set in advance for a video signal whose contents are known, and the length of a GOP 101 having an initial GOP configuration is made variable in accordance with the editable point insertion positions 102 to 104. In coding operation, the standardized editable point condition is checked in step S2 in FIG. 6 for each of the editable point insertion positions 102 to 104. As in the case shown in FIG. 7, this condition determination processing is performed by checking a buffer connection condition 100, i.e., checking whether condition (2) that the VBV buffer occupancy should be larger than the predetermined value is satisfied.

If it is determined upon this condition determination processing that the standardized editable point condition is satisfied, an editable point (coding editable point) is immediately inserted at the initial editable point insertion position. In the case shown in FIG. 8, of the editable point insertion positions 102 to 104, the positions 102 and 103 are "OK" with respect to the buffer connection condition 100, i.e., satisfy the standardized editable point condition. Editable points are therefore confirmed in step S3 in FIG. 6, and coding editable points 105 and 106 are inserted at these positions 102 and 103.

Another editable point insertion position 104 is "NG" with respect to the buffer connection condition 100, i.e., does not satisfy the standardized editable point condition. Rate control is therefore performed by changing the GOP length to delay the initial editing editable point insertion position 104 (i.e., to shift a GOP boundary) in correspondence with an editable point by which the buffer connection condition is satisfied, and reducing the assigned number of bits to make the buffer connection condition 100 to satisfy (step S4 in FIG. 6), thereby inserting a coding editable point 107 at the delayed position. In this case, the coding editable point can be inserted with high precision by matching the initial GOP configuration with the editable point insertion position in advance.

In each of the cases shown in FIGS. 7 and 8, since each editable point insertion position is known in advance, a coding editable point can be inserted at each desired position more accurately by performing VBV management processing in advance to satisfy the standardized editable point condition immediately before each editable point.

Figure 9:
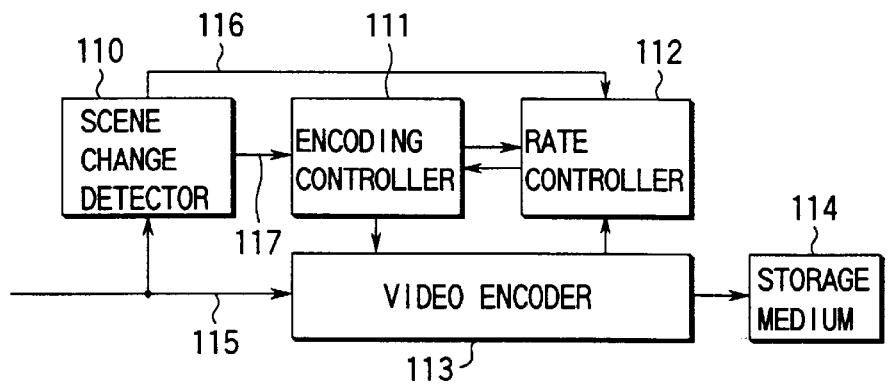
FIG. 9 is a block diagram showing the arrangement of a coder apparatus according to the second embodiment of the present invention.

FIG. 9 shows the arrangement of a coder apparatus according to the second embodiment of the present invention. The same reference numerals in FIG. 9 denote the same parts as in FIG. 1, and a detailed description thereof will be omitted.

A scene change detector 110 for detecting scene change positions from an input video signal is added to the arrangement shown in FIG. 1. In editing operation, it is important to consider scene change positions. In this embodiment, scene change positions are automatically extracted in real time as editable points.

Figure 10:
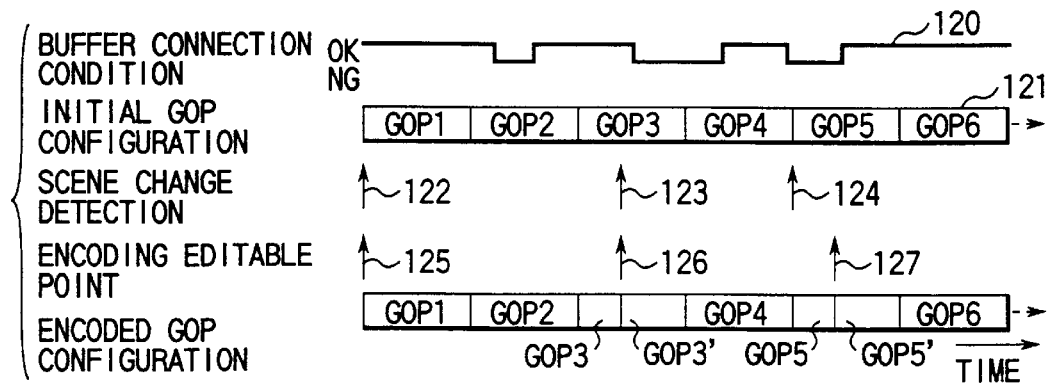
FIG. 10 is a timing chart showing a method of automatically inserting editable points in the second embodiment in detail.

A method of automatically inserting editable points based on scene change positions according to this embodiment will be described with reference to FIG. 10.

Scene change positions 122 to 124 detected by the scene change detector 110 in an initial GOP configuration before insertion of editable points are set as initial editable point insertion positions. In coding operation, determination whether the standardized editable point conditions are satisfied is performed for each of the scene change positions 122 to 124 in the same manner as described above.

If it is determined upon this determination processing that the standardized editable point conditions are satisfied, a scene change position as an initial editable point insertion position and a coding editable point are immediately inserted. In the case shown in FIG. 10, of the scene change positions 122 to 124, the positions 122 and 123 are "OK" with respect to a buffer connection condition 120 and satisfy the standardized editable point conditions. The editable points are therefore confirmed in step. S3 in FIG. 6, and coding editable points 125 and 126 are inserted at these positions 122 and 123.

Another scene change position 124 is "NG" with respect to the buffer connection condition 120 and does not satisfy the standardized editable point conditions. For this reason, rate control is performed by changing the GOP length and reducing the assigned number of generated bits in step S4 in FIG. 6, and a coding editable point 127 is inserted at the position set by delaying the scene change position 124 until the buffer connection condition 120 is satisfied.

With this operation, even in a case wherein the video signal obtained by image-sensing operation using a video camera is to be quickly coded, effective editable points can be automatically inserted in real time for editing operation after taking a picture, and a decrease in coding efficiency due to insertion of wasteful editable points can be prevented.

Note that change points of image contents may be detected from changes in other parameters such as the motion vector, luminance, and chrominance signal value of an input video signal as well as a scene change, and these points may be set as initial editable point insertion positions.

Figure 11:
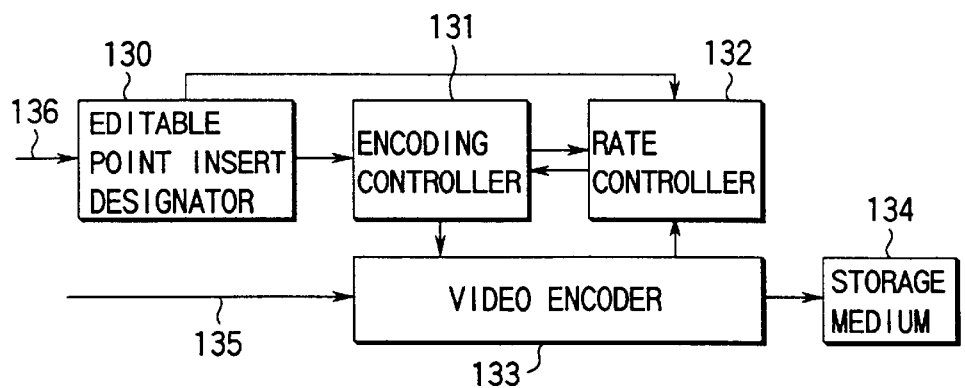
FIG. 11 is a block diagram showing the arrangement of a coder apparatus according to the third embodiment of the present invention.

FIG. 11 shows the arrangement of a coder apparatus according to the third embodiment of the present invention. The same reference numerals in FIG. 11 denote the same parts as in FIG. 1, and a detailed description thereof will be omitted.

In this embodiment, an editable point insertion designator 130 is added to the arrangement shown in FIG. 1. The user designates insertion of an editable point by using the editable point insertion designator 130 during coding of a video signal 135. An editable point is inserted in accordance with this designation.

According to this embodiment, in, for example, a handy type video camera, an editable point is marked by intentionally operating the editable point insertion designator 130, e.g., a marking button on the camera, during photographing operation, thereby allowing efficient search and edition after taking a picture. In addition, even when the video signal obtained by a video camera is reproduced and coded, the user can mark editable points while watching the video image reproduced by the VTR.

Figure 12:
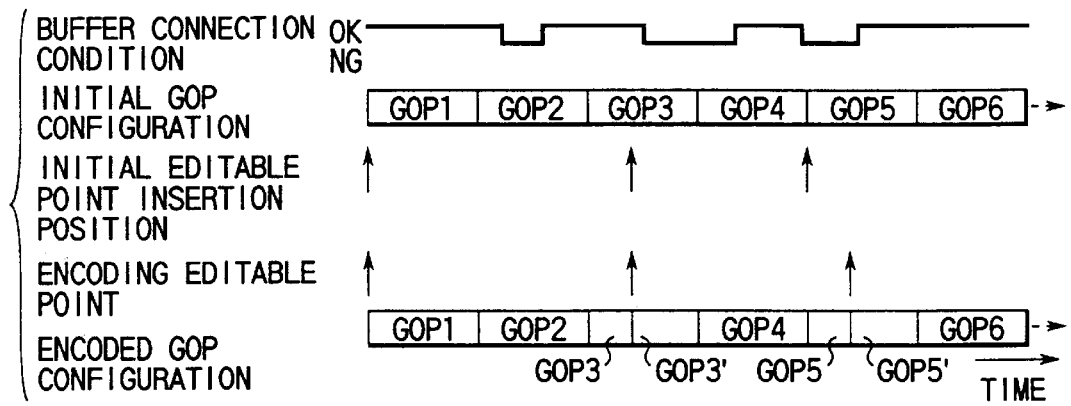
FIG. 12 is a timing chart showing a method of manually inserting editable points in the third embodiment in detail.

FIG. 12 shows a detailed example of the editable point insertion method according to this embodiment. An editable point insertion sequence after editable point insertion designation is the same as that in the second embodiment. More specifically, when editable point designation is performed by the editable point insertion designator 130 with respect to an input video signal, determination whether the standardized editable point conditions are satisfied is performed for each position designated by this editable point designation in coding operation in the same manner as described above. If it is determined upon this condition determination processing that the standardized editable point conditions are satisfied, an editable point (coding editable point) is immediately inserted at the designated position.

If the standardized editable point conditions are not satisfied, rate control is performed by changing the GOP length and reducing the assigned number of generated bits, and the designated editable point position is delayed until the standardized editable point conditions are satisfied. Then, a coding editable point is inserted at the delayed position.

The pieces of editable point information inserted in the coded data described in the first to third embodiments are not limited to these. These pieces of information may be recorded by the method shown in FIG. 13 or 14.

Figure 13:
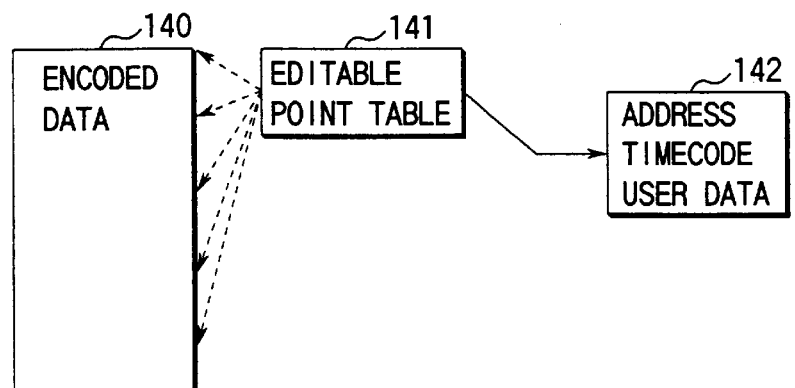
FIG. 13 is a block diagram showing an example of editable point recording method in the first to third embodiments of the present invention.

FIG. 13 shows a case wherein editable point information 142 is recorded on an editable point table 141 which is independent of coded data 140. As the editable point information 142, the address and time of each editable point in coded data and other pieces of information are recorded. As other pieces of information, a coded data connection condition for each editable point and the chapter number and chapter name of a sensed image can be recorded. Edition processing can be performed by detecting editable points by referring to the editable point table 141.

Figure 14:
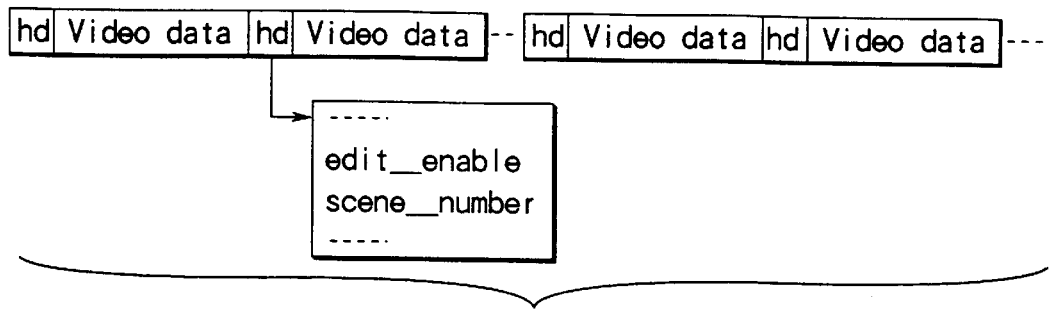
FIG. 14 is a view showing an example of an editable point recording method in the first to third embodiments of the present invention.

FIG. 14 shows a case wherein editable point information similar to that in FIG. 13 is multiplexed and recorded in a header area in coded data. According to this technique, a video data area follows a header area hd, and editable point information is recorded in the header area dh.

Figure 15:
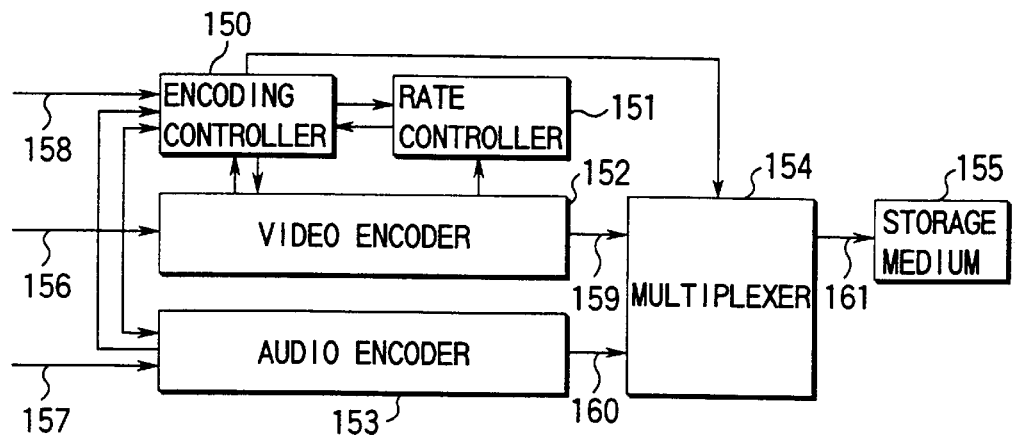
FIG. 15 is a block diagram showing the arrangement of a coder apparatus according to the fourth embodiment of the present invention.

FIG. 15 shows the arrangement of a coder apparatus according to the fourth embodiment of the present invention. The same reference numerals in FIG. 15 denote the same parts as in FIG. 1, and a detailed description thereof will be omitted.

In this embodiment, an audio coder 153 and a multiplexer 154 are added to the arrangement shown in FIG. 1. The audio coder 153 codes an input audio signal 157. The multiplexer 154 multiplexes coded video data 159 from a video coder 152 for coding an input video signal 156 and coded audio data 160. In addition, in this embodiment, audio data at the time corresponding each editable point inserted in an image signal is recorded on a storage medium 155 in correspondence with the position of the editable point.

According to the fourth embodiment, editable point insertion information 158, the video signal 156, and an audio signal 157 are respectively input to an encoding controller 150, the video coder 152, and the audio coder 153. The encoding controller 150 determines a GOP configuration and editable point insertion positions in accordance with the editable point insertion information 158. Actual insertion of editable points is performed by the encoding controller 150 and a rate controller 151 in cooperation.

The video coder 152 codes an input video signal in accordance with the coding control parameters from the encoding controller 150. The audio coder 153 codes an input audio signal in accordance with the coding control parameters from the encoding controller 150. This audio coder 153 can use a waveform coding scheme, a hybrid coding scheme, or the like. The coded audio data is multiplexed with the image signal by the multiplexer 154 in correspondence with each editable point inserted in the video data in terms of time. The multiplexed video and audio data is stored in the storage medium 155.

Figure 16:
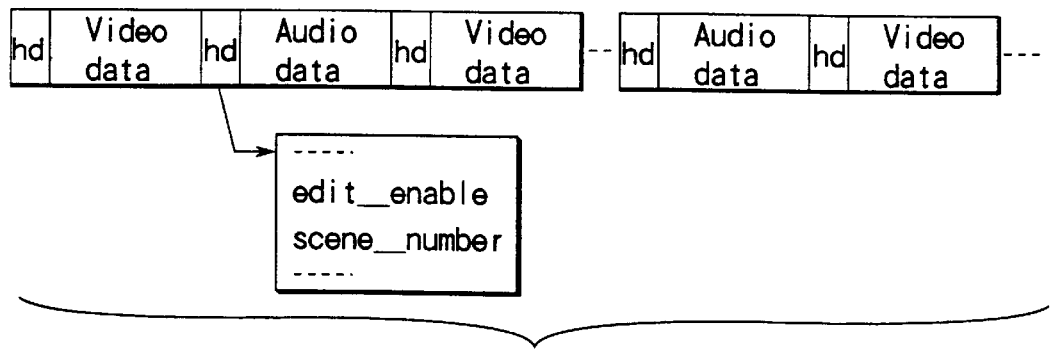
FIG. 16 is a view showing an example of an editable point recording method according to the fourth embodiment.

The above editable point information may be recorded on an independent table as shown in FIG. 13, or may be recorded on the header portions of the multiplexed video and audio data as shown in FIG. 16.

Figure 17:
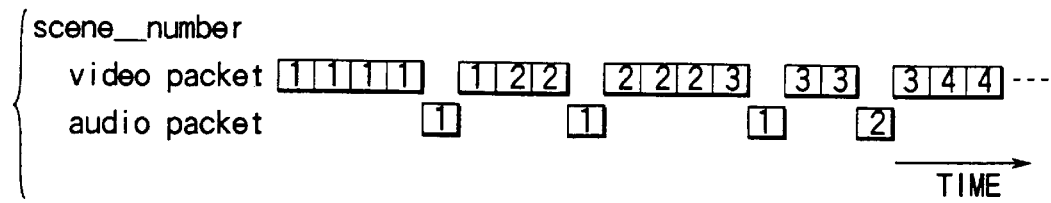
FIG. 17 is an example of a packet multiplex for video coded data and audio coded data.

In general, when video data and audio data are to be multiplexed into a packet, the video data and the audio data to be displayed at the same time are not necessarily multiplexed at adjacent positions, as shown in FIG. 17. For this reason, when cut and paste editing is to be performed for coded data obtained by multiplexing video and audio data, data at an editable point at the same time are video and audio data, which are located at different positions in the multiplexed data. Therefore, multiplexing of editable point information in the header portion of each of video and audio data packets facilitates cut and paste editing of the multiplexed data.

Furthermore, addition of different IDs to video and audio data at each editable point makes it easy to make video and audio data correspond to each editable point. This improves the edition efficiency.

As has been described above, according to the present invention, in coding a video signal, a video coding signal, and a corresponding audio signal, since editable points can be efficiently inserted, edition processing such as cut and paste editing on the coded data level can be easily performed.

By adaptively inserting editable points on the basis of editable point information periodically designated or designated in advance, the results obtained by automatically detecting scene change positions, or editable point insertion designation performed by the user in real time, editable points can be inserted at accurate positions while a decrease in coding efficiency is suppressed.

In addition, edition processing can be performed efficiently by recording information of each inserted editable point on an independent table or multiplexing the information as independent ID information in each header area of coded data.

Furthermore, when video and audio data are to be simultaneously coded, edition processing using ID information makes it easy to make the video and audio data in the coded data correspond to each other.

Moreover, according to the present invention, when coded video data or part of all of coded video and audio data is to be connected to another coded video data or other coded video and audio data, editable point position information that enables seamless connection in terms of the coding mode for the coded video data, the buffer occupancy of a video buffering verifier, and a display field phase with respect to a coded frame is recorded on a recording medium, e.g., an optical disk such as a DVD or a magnetic tape for a VTR, together with the coded video data or coded video and audio data, thereby efficiently performing edition processing such as cut and paste editing while reproducing a video or audio signal from such a recording medium.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An editable point insertion method in a video coder apparatus, comprising:
    receiving coded image data obtained by coding a video signal in units of coded frames using one of a plurality of coding modes including intraframe coding and motion compensated interframe predictive coding;
    designating an editable point to be inserted into the coded image data;
    extracting information including the one of the coding modes and a display field phase of the coded image data and a buffer occupancy of a video buffering verifier;
    determining based on the extracted information whether predetermined conditions are satisfied in order to insert the editable point into the coded image data;
    delaying insertion of the editable point until the predetermined conditions are satisfied; and
    inserting the editable point into the coded image data.

2. A method according to claim 1, further comprising:
    dynamically changing a GOP (Group-Of-Pictures) configuration by controlling the one of the coding modes when one said condition is unsatisfied;
    performing rate control to reduce a number of bits assigned to a next or subsequent coded frame when a second said condition is unsatisfied; and
    adjusting a field phase when a third said condition is unsatisfied.

3. A method according to claim 2, wherein the step of delaying insertion of the editable point includes delaying the insertion of the editable point until at least one of the steps of changing the GOP configuration, performing rate control, and adjusting the field phase is completed.

4. A method according to claim 1, wherein the designating step includes periodically designating the insertion of the editable point at predetermined intervals.

5. A method according to claim 1, wherein the designating step includes sequentially designating the insertion of the editable point at predetermined time points.

6. A method according to claim 1, wherein the determining step includes
    the predetermined conditions including
        a next coded frame being a first coded frame of a closed GOP (Group-Of-Pictures) without coding reference to a coded frame in a preceding GOP,
        the buffer occupancy being at least a predetermined value, and
        a preceding display frame ending at a bottom field.

7. An editable point insertion method in a video coder apparatus, comprising the steps of:
    receiving coded image data obtained by coding a video signal in units of coded frames using one of a plurality of coding modes including intraframe coding and motion compensated interframe predictive coding;
    checking whether editable point insertion designation is made;
    extracting information associated with the one of the coding modes, a buffer occupancy of a video buffering verifier, and a display field phase corresponding to the coded frames from the coded image data;
    performing condition determination based on the extracted information to obtain a standardized editable point at which at least part of the coded image data is connected to another coded image data seamlessly; and
    when an editable point does not satisfy a condition for being the standardized editable point, delaying insertion of the editable point until the condition is satisfied,
        wherein the step of receiving the coded image data includes receiving coded audio data obtained by coding an audio signal corresponding to the video signal, and the step of performing condition determination includes performing condition determination based on the extracted information to obtain the standardized editable point that allows seamless connection when at least part of the coded video and audio data is connected to other coded video and audio data.

8. A coder apparatus comprising:
    coding means for coding an input video signal in units of coded frames to produce coded data using one of a plurality of coding modes including intraframe coding and motion compensated interframe predictive coding and outputting the coded data;
    coding mode control means for controlling switching of the coding modes;
    bit allocation control means for controlling a number of generated bits of the coded data from said coding means in accordance with a video buffering verifier;
    extraction means for extracting information including a display field phase and the one of the coding modes of the coded data and a buffer occupancy of the video buffering verifier;
    condition determination means for determining based on the extracted information whether predetermined conditions are satisfied in order to insert an editable point into the coded data;

means for delaying insertion of the editable point until the predetermined conditions are satisfied; and means for inserting the editable point into the coded data.

9. An apparatus according to claim 8, wherein the means for delaying performs changing the one of the coding modes when one of the predetermined conditions is unsatisfied, reducing a number of bits assigned to a next coded frame when a second of the predetermined conditions is unsatisfied, and inverting a field phase of a coded frame when a third of the predetermined conditions is unsatisfied.

10. An apparatus according to claim 8, wherein an insertion position of the editable point corresponds to at least one of predetermined time intervals, a predetermined time, a change point of image contents detected from a change in parameter including at least one of a scene change, a motion amount, a luminance value, and a chrominance value of the video signal, and a manually designated position.

11. An apparatus according to claim 8, comprising:

means for periodically designating the insertion of the editable point at predetermined intervals.

12. An apparatus according to claim 8, comprising:

means for sequentially designating the insertion of the editable point at predetermined time points.

13. An apparatus according to claim 8, comprising:

a detector configured to detect a scene change in the video signal,
wherein said means for inserting inserts the editable point at a position corresponding to the scene change.

14. An apparatus according to claim 8, wherein the predetermined conditions include a next coded frame being a first coded frame of a closed GOP (Group-Of-Pictures) without coding reference to a coded frame in a preceding GOP, the buffer occupancy being at least a predetermined value, and a preceding display frame ending at a bottom field.

15. A coder apparatus comprising:

coding means for coding an input video signal in units of coded frames to produce coded data using one of a plurality of coding modes including intraframe coding and motion compensated predictive interframe coding and outputting the coded data;

coding mode control means for controlling switching of the coding modes;

bit allocation control means for controlling a number of generated bits of the coded data from said coding means in accordance with a video buffering verifier;

extraction means for extracting information including a display field phase and t he one of the coding modes of the coded data and a buffer occupancy of the video buffering verifier;

condition determination means for performing condition determination based on the information extracted by said extraction means in order to obtain a standardized editable point at which at least part of the coded data can be connected to another coded data seamlessly; and editable point insertion means for inserting an editable point and for delaying insertion of the editable point when the editable point does not satisfy a condition for being the standardized editable point until the condition is satisfied;

audio coding means for coding an audio signal corresponding to the video signal and outputting coded audio data; and multiplexing means for multiplexing the coded video and audio data and outputting multiplexed data,
wherein said condition determination means performs condition determination based on the information extracted by said extraction means to obtain the standardized editable point at which at least part of the coded video and audio data can be connected to other coded video and audio data seamlessly.

16. An apparatus according to claim 15, wherein when said condition determination means determines that the editable point for which the insertion designation is performed does not satisfy the standardized editable point condition, said editable point insertion means performs control including at least one of operations of (a) changing a coding mode, (b) reducing the number of generated bits assigned to a next coded frame, and (c) inverting a field phase of the coded frame, thereby delaying the editable point, for which the insertion designation is performed, until said condition determination means determines that the standardized editable point condition is satisfied.

17. An apparatus according to claim 15, wherein a position of the designated editable point corresponds to at least one of (a) time at predetermined intervals, (b) time designated in advance, (c) time of a change point of image contents which is detected from a change in parameter including at least one of a scene change of the input video signal, a motion amount, a luminance, and a chrominance signal value, and (d) a manually designated position.

18. An apparatus according to claim 15, wherein said editable point insertion means records editable point position information in the coded video data or in the coded video and audio data as data independent of the coded data.

19. A coder apparatus according to claim 15, wherein said editable point insertion means multiplexes editable point position information in the coded video data or in the coded video and audio data with the coded data.

20. An apparatus according to claim 15, wherein the editable point insertion means records editable point position information in the multiplexed data independent of the coded video and audio data included in the multiplexed data or multiplexes the position information with the coded video and audio data.

21. A computer program product including a computer readable medium for inserting an editable point, comprising:

receiving code configured to receive coded image data obtained by coding a video signal in units of coded frames using one of a plurality of coding modes including intraframe coding and motion compensated interframe predictive coding;

designating code configured to designate the editable point to be inserted into the coded imaged data;

extracting code configured to extract information including the one of the coding modes and a display field phase of the coded image data and a buffer occupancy of a video buffering verifier;

determining code configured to determine based on the extracted information whether predetermined conditions are satisfied in order to insert the editable point into the coded image data;

delaying code configured to delay insertion of the editable point until the predetermined conditions are satisfied; and inserting code configured to insert the editable point into the coded image data.

22. A computer program product according to claim 21, wherein the predetermined conditions include a next coded frame being a first coded frame of a closed GOP (Group-Of-Pictures) without coding reference to a coded frame in a preceding GOP, the buffer occupancy being at least a predetermined value, and a preceding display frame ending at a bottom field.

* * * * *